Sept. 10, 1929.　　E. C. EBERTS ET AL　　1,727,967
APPARATUS FOR TREATING FRUITS
Filed Dec. 16, 1925
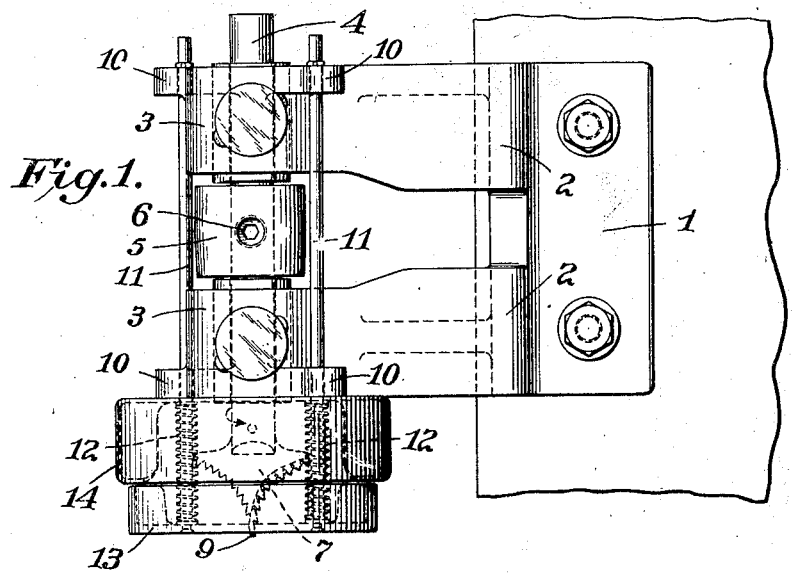
Fig.1.
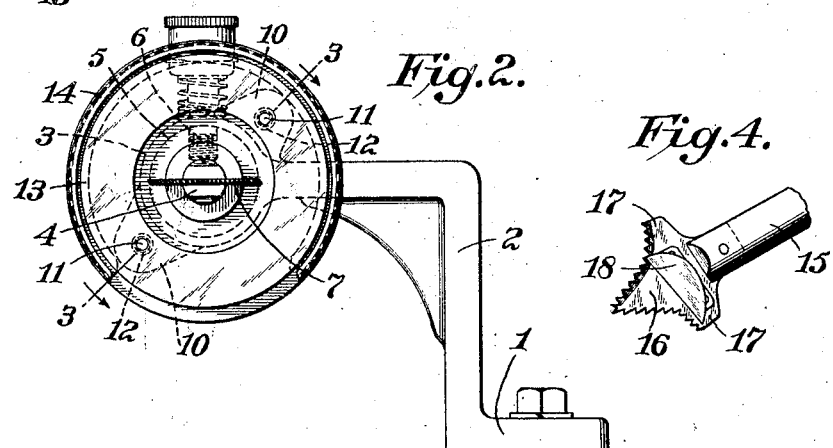
Fig.2.　　Fig.4.
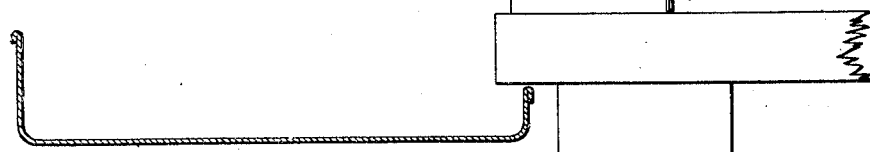
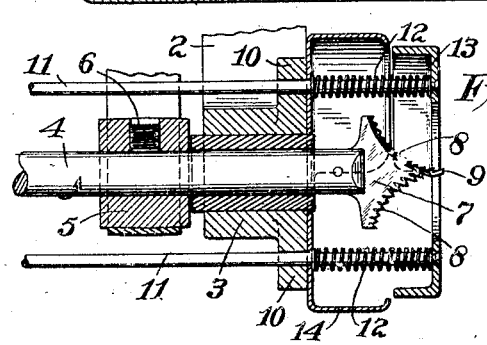
Fig.3.
*Inventors:*
Edward C. Eberts,
Edward D. Eberts, &
Willis L. Hooker,
by Spear, Middleton, Donaldson, Hall
*Attys.*

Patented Sept. 10, 1929.

1,727,967

UNITED STATES PATENT OFFICE.

EDWARD C. EBERTS, EDWARD D. EBERTS, AND WILLIS L. HOOKER, OF JEFFERSONVILLE, INDIANA.

APPARATUS FOR TREATING FRUITS.

Application filed December 16, 1925. Serial No. 75,784.

This invention relates to an apparatus for coring and trimming tomatoes and is particularly adapted to remove the cores without unduly rupturing the seed cells and to trim away the green stem end of the tomato.

In processing and canning tomatoes it is necessary and desirable to completely remove all of the core and the green stem end of the fruit to facilitate the sterilizing operation. If the core and any of the green part are not completely removed the processing heat must be greatly increased and prolonged in order to fully sterilize these parts and render them immune to fermentation. This prolongation of the processing heat is very detrimental to the good part of the tomato and overcooks and sterilizes it causing a breaking down of the cell structure which turns the tomato to a mass of pulp and thereby lowers the grading of the product.

Hand coring and trimming removes these undesirable parts quite efficiently but is more or less of a laborious and expensive operation. Our improved apparatus, which is shown in simple form for illustration, enables one operator to handle a much larger quantity of product in a given time and tends to produce a much more uniform and desirable article and enables the canner to secure a much larger portion of the fancy grades of product, from the same raw material and at much less expense.

We have embodied our invention in a simple hand operated device, by hand operated we refer particularly to the placing of the fruits in place for coring and trimming. The apparatus comprises a rotatable coring and trimming device, properly shielded to protect the operator, preferably power driven, and having means permitting the operator to nicely gauge the exact amount of material to remove from each fruit treated. The apparatus may be arranged to core only where very ripe fruit is being handled, or to both core and trim away any green portions where only partially ripe fruit is being handled, the adjustments for these different operations being easily and quickly effected.

It is therefore an object of our invention to provide an apparatus for coring, or for coring and trimming fruits.

It is a further object of our invention to provide an apparatus having rotating core removing devices that will not unduly cut into and break the seed cells of such fruits as tomatoes.

It is also an object of our invention to provide an apparatus for treating fruits wherein the moving parts are shielded to protect the operator from injury and wherein the shielding means are utilized as gauge means for determining the extent of treatment accorded each handled fruit.

It is also an object of our invention to provide an apparatus for treating fruits that has power driven trimming and treating means, but that is hand operated as to placement and removal of the fruits being treated.

With such objects in view as well as other advantages evolved in the development of the invention, we wish it understood that the several necessary elements and combinations constituting the same may be varied in their proportions, placement, general arrangement and operative relation without departing from the nature of the invention, also that the described devices are simply embodiments of the invention in a simple structure which other structures might employ without departing from the purview of the invention and we regard ourselves as entitled to such variations from the shown and described devices as fall within the scope and meaning of the claims hereto appended.

Reference being now had to the accompanying drawings a better and clearer understanding of the invention will be had. The drawings supplied herewith are more or less diagrammatic in character, and while they show the invention in a preferred form they are not necessarily drawn to scale neither do they necessarily represent the best engineering practices in constructing apparatus of this nature.

Figure 1 is a plan view of one embodiment of our invention.

Fig. 2 is a side elevation.

Fig. 3 is a sectional plan.

Fig. 4 is a perspective view of a modified form of blade.

Referring now with particularity to the drawings, we have shown a base 1 which is adapted to be bolted to a table or stand convenient to the operator, said base having uprights 2 carrying bearings 3 therein. The bearings are adapted to receive the shaft 4 of a knife and in the form illustrated a pulley 5 is secured to the shaft 4 between the bearings 3 and held thereon by means of set screws 6.

Attached to the end of the knife shaft 4 is a substantially triangular blade 7 two sides of which are provided with saw teeth 8, the saw teeth on one edge being staggered in relation to the saw teeth on the opposite edge. The apex 9 of the blade is adapted to enter the tomato upon rotation of the knife and remove the core therefrom.

Carried by wings 10 on the bearings 3 are a plurality of rods 11 which project on each side of the blade, the projecting end being encircled by a coil spring 12 and the end of the rods carrying a guard 13 movable axially of the knife shaft 4 against the tension of the spring 12. This guard 13 moves telescopically within a secondary guard element 14 so that when the blade is rotating the operator is entirely protected, but when it is desired to remove the core from a tomato it only becomes necessary for the operator to press the tomato against the guard 13 and to move the same axially of the knife shaft, upon which action the guard 13 telescopes into the secondary guard 14, the blade 7 projecting through the aperture therein so that the tomato may be acted upon.

As a modified form of blade, we may use one which consists of a shaft 15 to which is attached a slightly modified blade 16, which comprises a substantially triangular shaped section with wings 17 attached to the base thereof, opposite sides of the blade being provided with saw teeth staggered in relation to each other, as in the preferred form of the invention.

Secured to the base of the blade 16 is an arc-shaped knife 18 making a slight angle with the plane of rotation of any point in the blade 16, and which is slightly out of perpendicular with the axis of the knife shaft, being inclined away from the point of the blade. It will be seen that upon rotation of this knife, the apex of the blade will enter the tomato and core the same, while the side blade will snip the top therefrom and due to its angular position will forcibly draw the cut top away from the body of the tomato.

Obviously where it is not desired to remove the top of the tomato, as for instance where very ripe fruit is being acted upon, the use of the modified form of blade with the top cutting knife, will not be necessary, but the other form will be desirable.

The complementary guard elements are provided at their bottom with cut away portions to enable the cores and tops cut from the tomatoes to drop therefrom into a refuse belt or other receptacle provided for the purpose.

*Operation*

The description of the apparatus constituting the invention has practically suggested the operation, so that little need be added on this score.

Any number of the devices may be placed along the peeling and sorting tables so that each operator will have one available at all times.

The operation of the machine and the effective manner in which the cores and undesired parts may be removed from the sorted and selected tomatoes permits of the packing of the very highest grades of fancy product which of course brings to the packer the highest prices for his product. The complete removal of the undesired parts of the choice tomatoes permits processing them at a much lower temperature than would otherwise be necessary thus leaving the fruits whole and solid in which manner the fancies are packed.

The coring and trimming knives may be operated at any desired speed but we have found that a speed approximating four thousand revolutions per minute gives very high grade results on tomatoes. When handling other fruits other speeds may be desirable and necessary and may be regulated accordingly.

Having thus described our invention, what we claim is:—

1. A tomato coring knife comprising a rotatable shaft, a blade carried at the end thereof, said blade comprising a saw toothed edge angularly disposed with regard to the axis of the knife shaft, and a second blade adjacent the first mentioned blade and attached thereto and extending outwardly at substantially right angles thereto.

2. A tomato trimming device comprising a support, bearings carried thereby, a rotatable shaft mounted in said bearings, said shaft carrying a tomato trimming knife at the end thereof, complementary telescoping guards surrounding the knife and normally covering the same, and spring means between the complementary guards.

3. A tomato trimming device comprising a support, bearings carried thereby, a rotatable shaft mounted in said bearings, a tomato trimming knife carried at the end thereof, complementary guard members normally surrounding said blade, spring means separating the complementary guard members, the outer member having an axial aperture therethrough through which the blade is adapted to project when the guard members are made to approach each other.

4. An apparatus for coring and trimming fruits comprising a rotatable trimming and coring knife, a guard enclosing said knife constituting a fixed and a movable member, a yielding support for said movable member enclosed within said fixed member, an aperture in said movable member through which said knife may protrude when said member is moved, with means for giving continuous rotation to said coring knife.

5. An apparatus for coring and trimming fruits comprising a rotatable coring and trimming knife, a cylindrical cup shaped guard enclosing said knife and constituting a fixed and movable member, a yielding support for said movable member fully enclosed within said fixed and said movable members, an aperture in said movable member by means of which fruit may be presented to said enclosed knife, with means for giving continuous rotation to said knife.

In testimony whereof we affix our signatures.

EDWARD C. EBERTS.
EDWARD D. EBERTS.
WILLIS L. HOOKER.